US009505364B1

(12) United States Patent
Schulzetenberg et al.

(10) Patent No.: US 9,505,364 B1
(45) Date of Patent: Nov. 29, 2016

(54) VEHICLE GUARD SYSTEM

(71) Applicants: John M. Schulzetenberg, Sioux Falls, SD (US); Shane T. Piper, Valley Springs, SD (US)

(72) Inventors: John M. Schulzetenberg, Sioux Falls, SD (US); Shane T. Piper, Valley Springs, SD (US)

(73) Assignee: CURT Manufacturing, LLC, Eau Claire, WI (US)

( * ) Notice: Subject to any disclaimer, the term of this patent is extended or adjusted under 35 U.S.C. 154(b) by 0 days.

(21) Appl. No.: 14/807,445

(22) Filed: Jul. 23, 2015

(51) Int. Cl.
*B60R 19/46* (2006.01)
*B60R 19/38* (2006.01)

(52) U.S. Cl.
CPC ............... *B60R 19/46* (2013.01); *B60R 19/38* (2013.01)

(58) Field of Classification Search
CPC ........ B60R 19/38; B60R 19/46; B60R 19/52
USPC ................. 293/115, 118, 119, 142, 143, 145
See application file for complete search history.

(56) References Cited

U.S. PATENT DOCUMENTS

| | | | | |
|---|---|---|---|---|
| 4,099,760 A * | 7/1978 | Mascotte | ............... | B62D 43/02 224/402 |
| 4,125,214 A * | 11/1978 | Penn | ......................... | B60R 9/06 224/508 |
| 5,067,760 A * | 11/1991 | Moore | .................... | B60R 19/52 180/68.6 |
| 6,447,032 B1 * | 9/2002 | Howell, Sr. | ............... | B60R 9/06 211/59.2 |
| 6,676,180 B1 * | 1/2004 | Houseman | .............. | B60R 19/52 293/115 |
| 8,998,291 B1 * | 4/2015 | Addis | ..................... | B60R 19/52 293/115 |
| 9,114,771 B2 * | 8/2015 | Drever | .................... | B60R 19/52 293/115 |
| 2009/0102219 A1 * | 4/2009 | Schrader | ............ | B62D 33/0273 296/37.5 |
| 2009/0212581 A1 * | 8/2009 | Drever | .................... | B60R 19/52 293/115 |
| 2013/0048399 A1 * | 2/2013 | Krajenke | .................. | E05F 5/06 180/89.1 |
| 2014/0306469 A1 * | 10/2014 | Drever | ................... | B60R 19/52 293/115 |

OTHER PUBLICATIONS

Ali Arc, Product Brochure, Winnipeg, Manitoba, Canada, 14 pages, date unknown.
Lite-Gard Product webpage, www.litegardllc.com/styles.htm, 3 pages, download date Jul. 23, 2015.
Lite-Gard LLC home page, www.litegardllc.com, 1 page, download date Jul. 23, 2015.
Ex-Guard Industries, Semi Truck Grill Guards, home page (1), http://ex-guard.com, 3 pages, download date Jul. 23, 2015.
Ex-Guard Industries, Semi Truck Grill Guards, home page (2), http://ex-guard.com, 3 pages, download date Jul. 23, 2015.
Ex-Guard Industries, XG Series, http://ex-guard.com/products/, 4 pages, download date Jul. 23, 2015.
Ex-Guard Industries, LT Series, http://ex-guard.com/products/lt-300-series/, 2 pages, download date Jul. 23, 2015.
Rigguard, Options & Accessories, www.rigguard.com/options.php, 1 page, download date Jul. 23, 2015.

(Continued)

*Primary Examiner* — Jason S Morrow
(74) *Attorney, Agent, or Firm* — Shewchuk IP Services, LLC; Jeffrey D. Shewchuk

(57) ABSTRACT

A guard apparatus for mounting on a vehicle may comprise a guard structure comprising a plurality of bars joined together and having a major plane, a guard mounting structure configured to mount the guard structure to the vehicle in a manner permitting movement of the major plane of the guard structure between a first position and a second position, and a guard securing structure configured to secure the guard structure in the first position and release the guard structure to move toward the second position. The guard securing structure may be configured to secure the guard structure in the first position using magnetic attraction force.

23 Claims, 11 Drawing Sheets

(56) References Cited

OTHER PUBLICATIONS

Rigguard, Customized Bumper Guards, www.rigguard.com/custom.php, 1 page, download date Jul. 23, 2015.
Rigguard, 2 Bar Bumper Guards, www.rigguard.com/2bar.php, 1 page, download date Jul. 23, 2015.
Rigguard, 2 × 4 Bumper Guards, www.rigguard.com/2x4.php, 1 page, download date Jul. 23, 2015.
Rigguard, 2 × 3 Bumper Guards, www.rigguard.com/2x3.php, 1 page, download date Jul. 23, 2015.
Rigguard, Full Bumper Guards, www.rigguard.com/full.php, 2 pages, download date Jul. 23, 2015.
Luverne Truck Equipment, Tuff Guard, www.luvernetruck.com/Product_Line/Tuff_Guard/tuff_guard.html, 1 page, download date Jul. 22, 2015.
Luverne Truck Equipment, Brandon, SD, Tuff Guard Installation Instructions 205629, 3 pages, revised Feb. 5, 2013.

\* cited by examiner

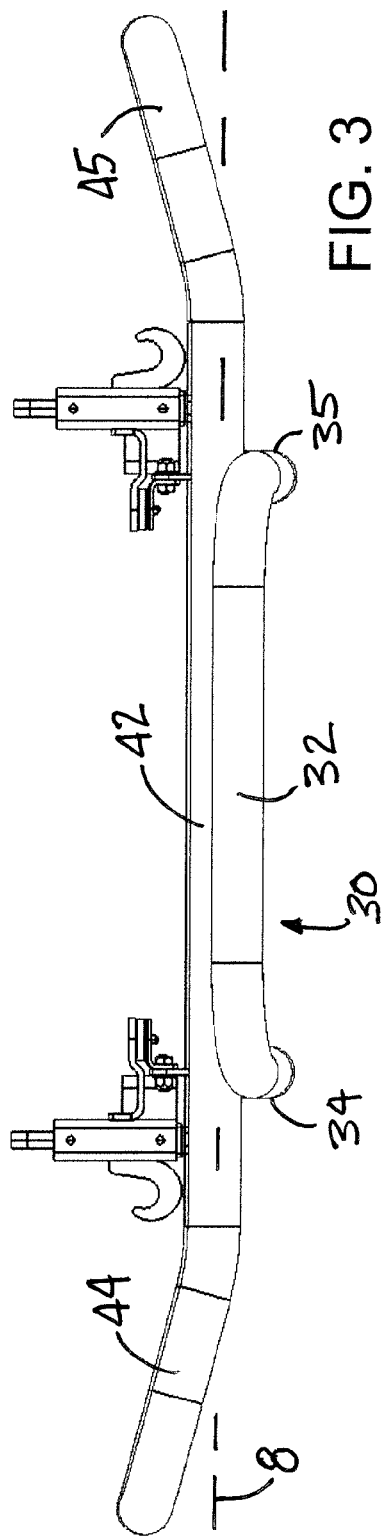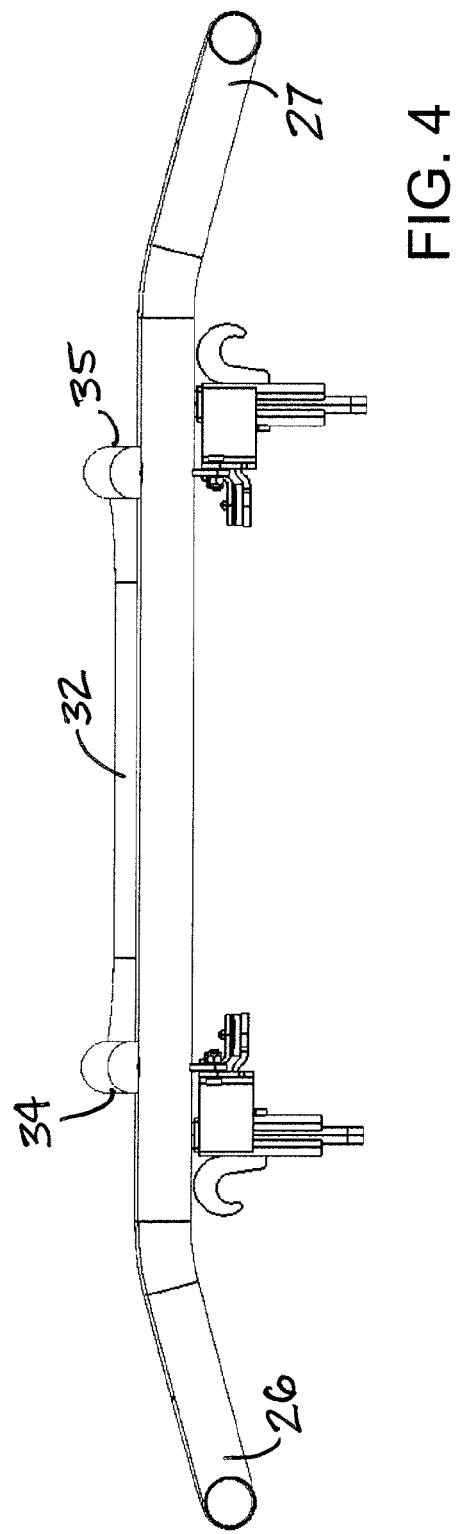
FIG. 3
FIG. 4

VEHICLE GUARD SYSTEM

BACKGROUND

Field

The present disclosure relates to vehicle guards and more particularly pertains to a new vehicle guard system with an improved means for securing a movable guard structure in an operational position.

Description of the Prior Art

Guards have been utilized to provide a degree of protection to the front ends of vehicles from impacts with inanimate objects (such as other vehicles, structures, walls, etc.) as well as animate objects (such as wildlife). In the case of larger over-the-road vehicles, such as semi tractors, the guard may impede or prevent the tilting of the truck cab to access the engine and running gear of the truck if the guard is not removable or (preferably) tiltable on its mounting on the vehicle. Tilting guards, such as the TUFF GUARD grille and bumper guards, available from the assignee of this application, utilize a latch that provides a physical interlock that holds the guard in the normal operational position and the latch must be physically released from the latched condition by moving (e.g., lifting) a set of latch handles that releases the interlock of the latch with elements on the mounting brackets to permit pivoting of the guard.

SUMMARY

The present disclosure relates to a guard apparatus for mounting on a vehicle, and the apparatus may comprise a guard structure comprising a plurality of bars joined together. The guard structure may have opposite ends for positioning adjacent to opposite sides of the front end of the vehicle, and may have a major plane. The apparatus may comprise a guard mounting structure configured to mount the guard structure to the vehicle in a manner permitting movement of the major plane of the guard structure between a first position and a second position, and a guard securing structure configured to secure the guard structure in the first position and release the guard structure to move toward the second position. The guard securing structure may be configured to secure the guard structure in the first position using magnetic attraction force.

There has been thus outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 3 is a schematic top view of the guard apparatus, according to an illustrative embodiment.

FIG. 4 is a schematic bottom view of the guard apparatus, according to an illustrative embodiment.

DETAILED DESCRIPTION

Figure 1:
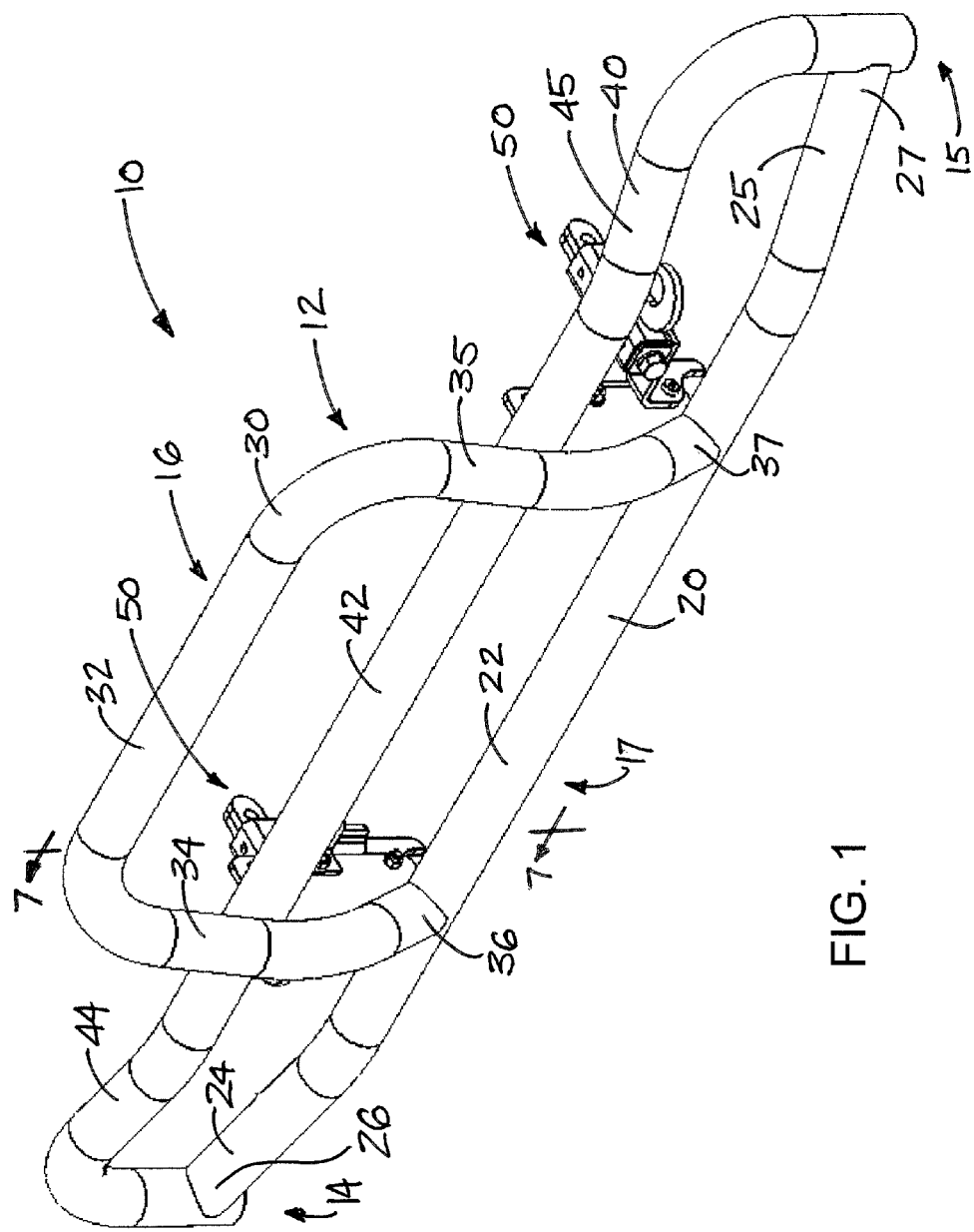
FIG. 1 is a schematic perspective view of a new guard apparatus in a first, operational, position, according to the present disclosure.
Figure 2:
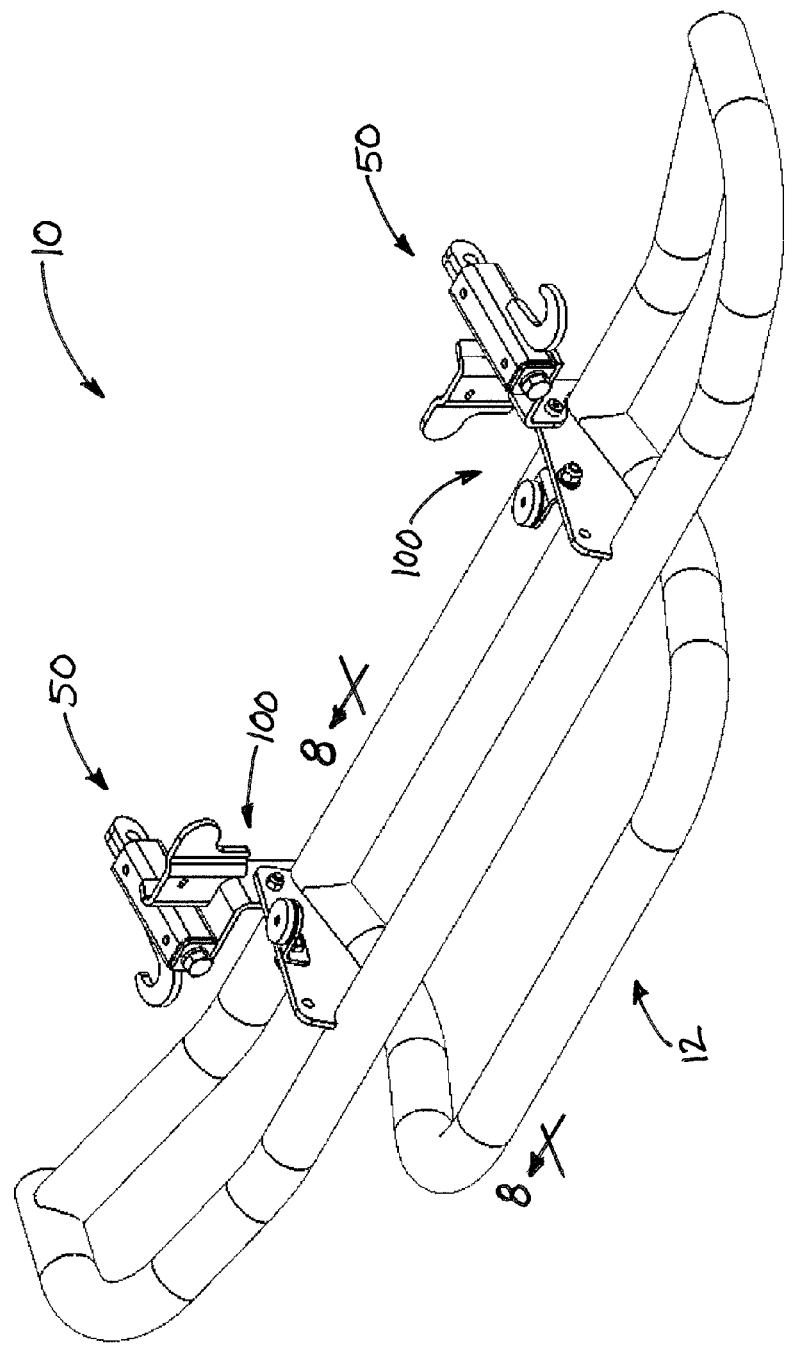
FIG. 2 is a schematic perspective view of the guard apparatus in a second, maintenance, position, according to the present disclosure.
Figure 5:
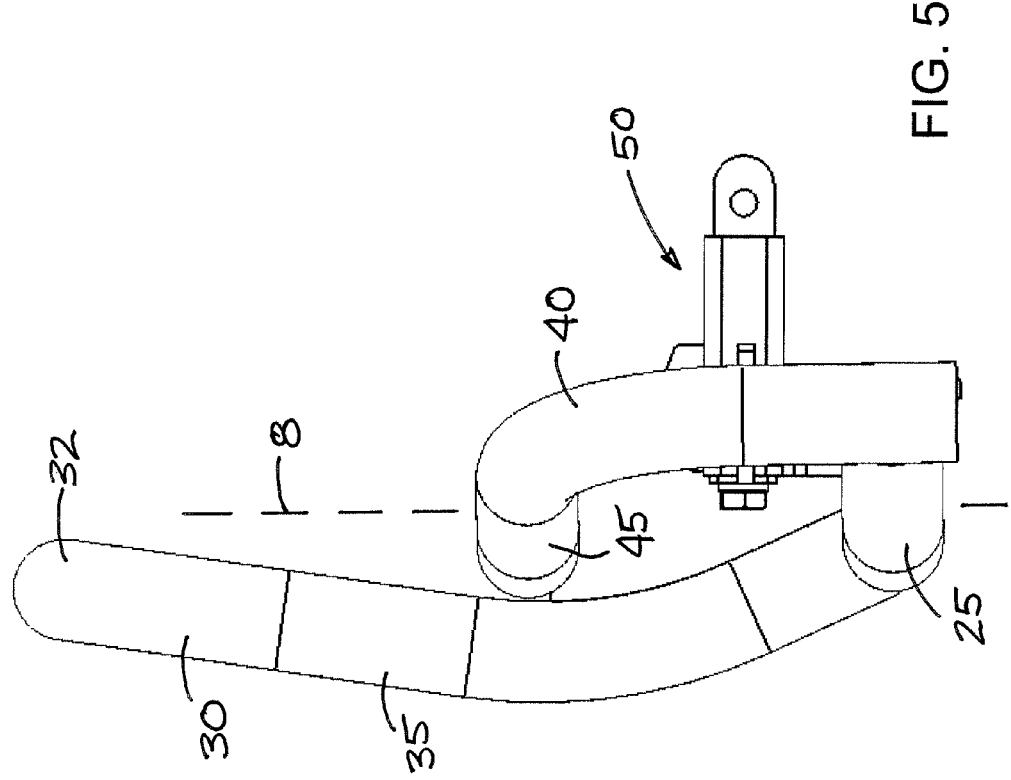
FIG. 5 is a schematic side view of the guard apparatus in the first position, according to an illustrative embodiment.
Figure 6:
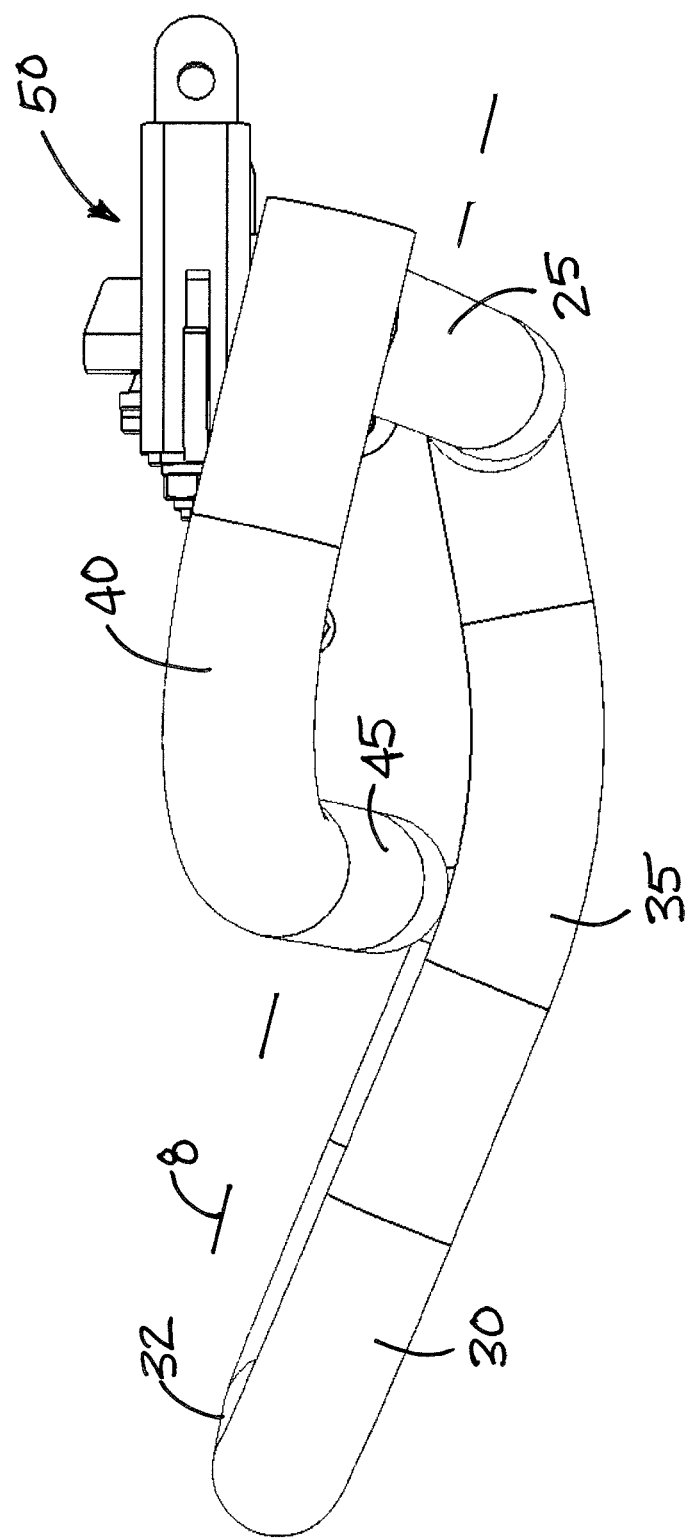
FIG. 6 is a schematic side view of the guard apparatus in the second position, according to an illustrative embodiment.
Figure 7:
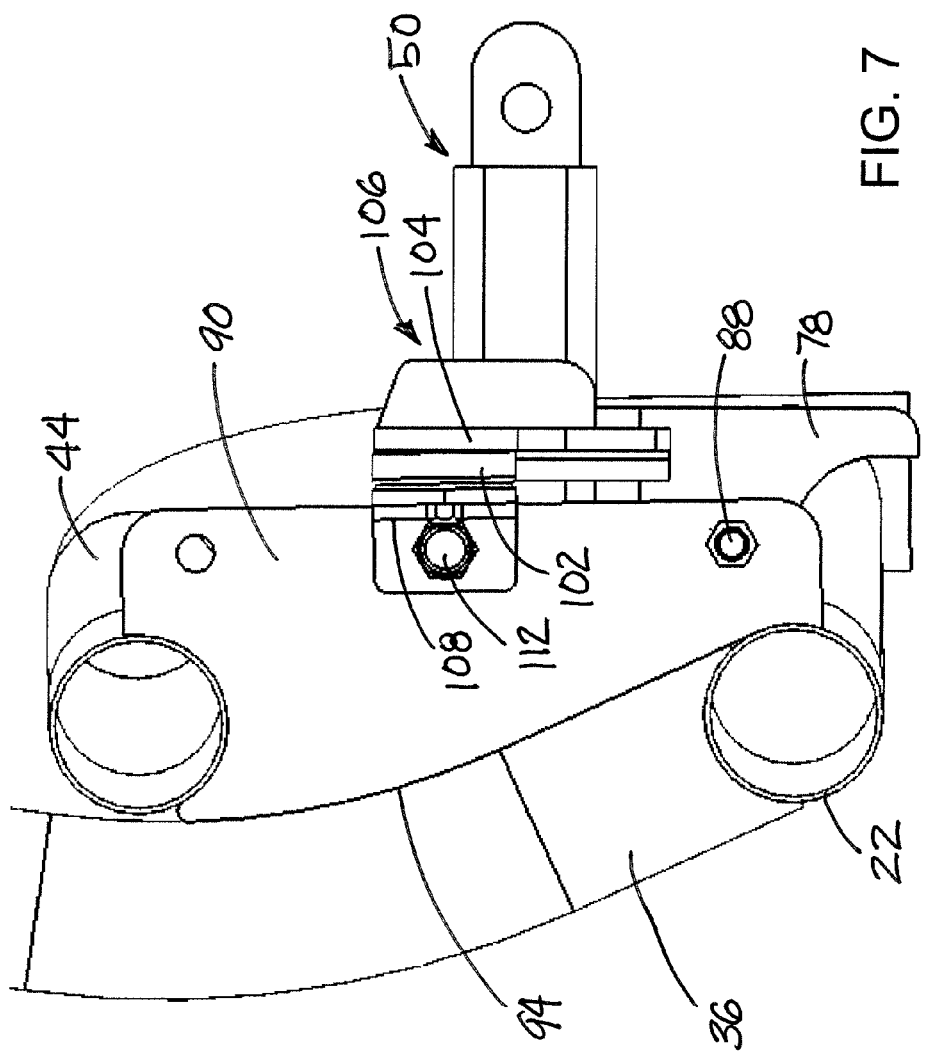
FIG. 7 is a schematic sectional view of the guard apparatus taken along line 7-7 in FIG. 1 and shown in the first position, according to an illustrative embodiment.
Figure 8:
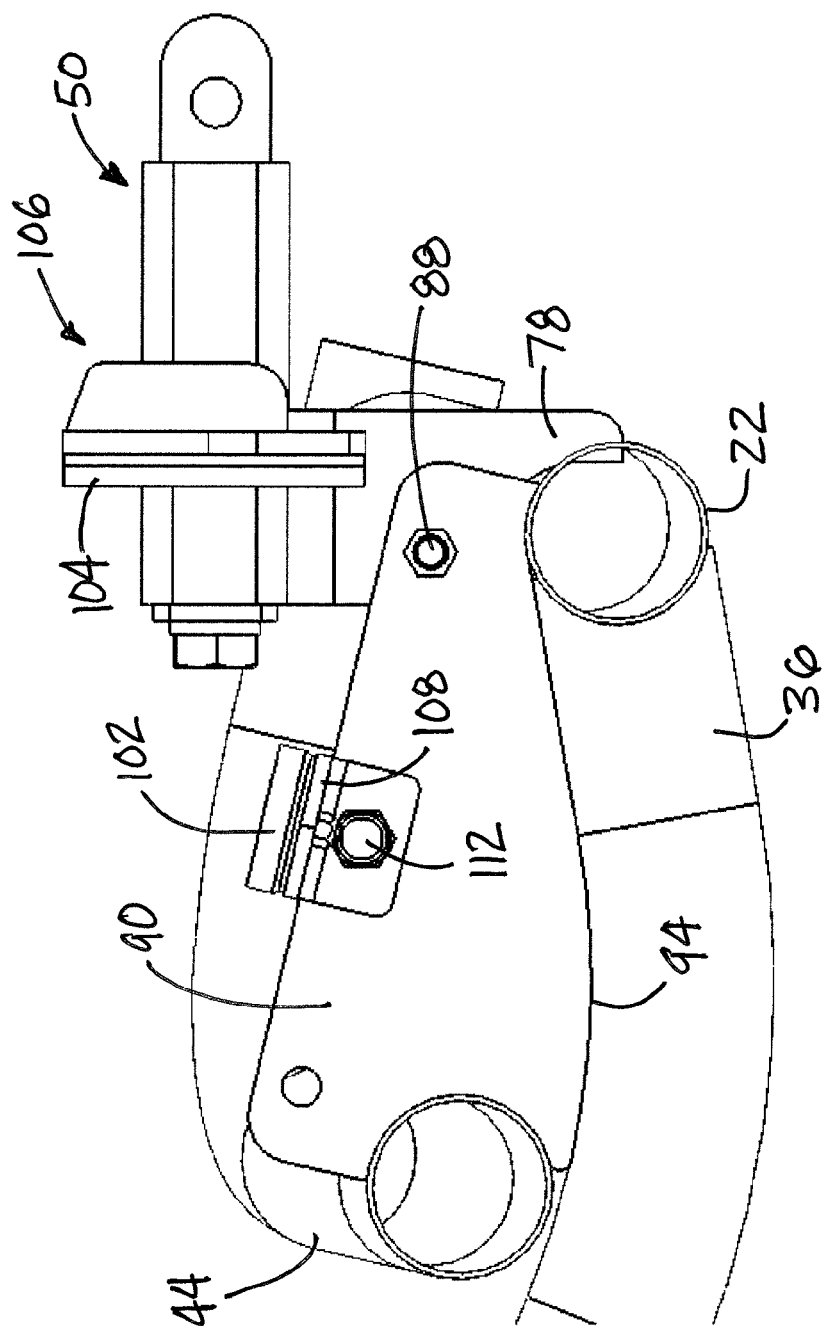
FIG. 8 is a schematic sectional view of the guard apparatus taken along line 8-8 in FIG. 2 and shown in the second position, according to an illustrative embodiment.
Figure 9:
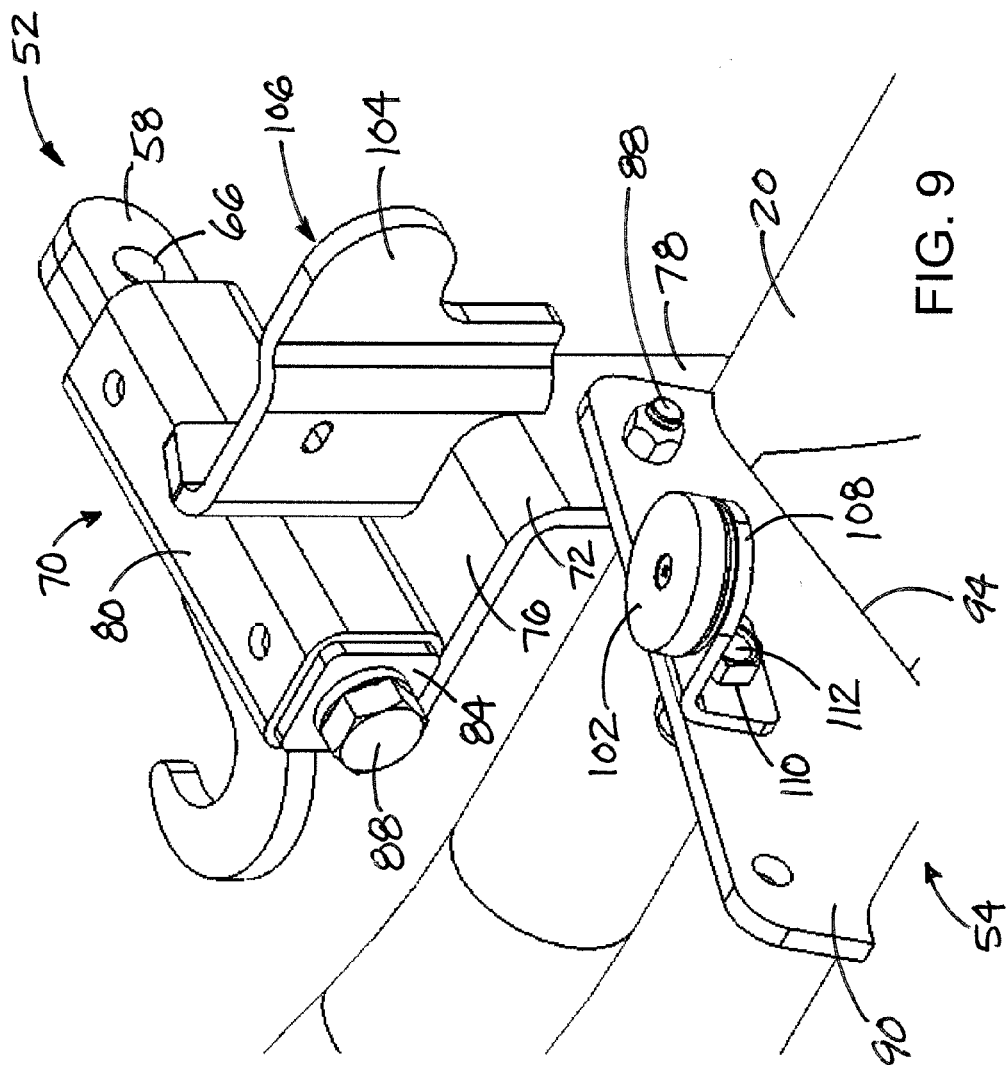
FIG. 9 is a schematic perspective view of a portion of the guard apparatus shown in the second position, according to an illustrative embodiment.
Figure 10:
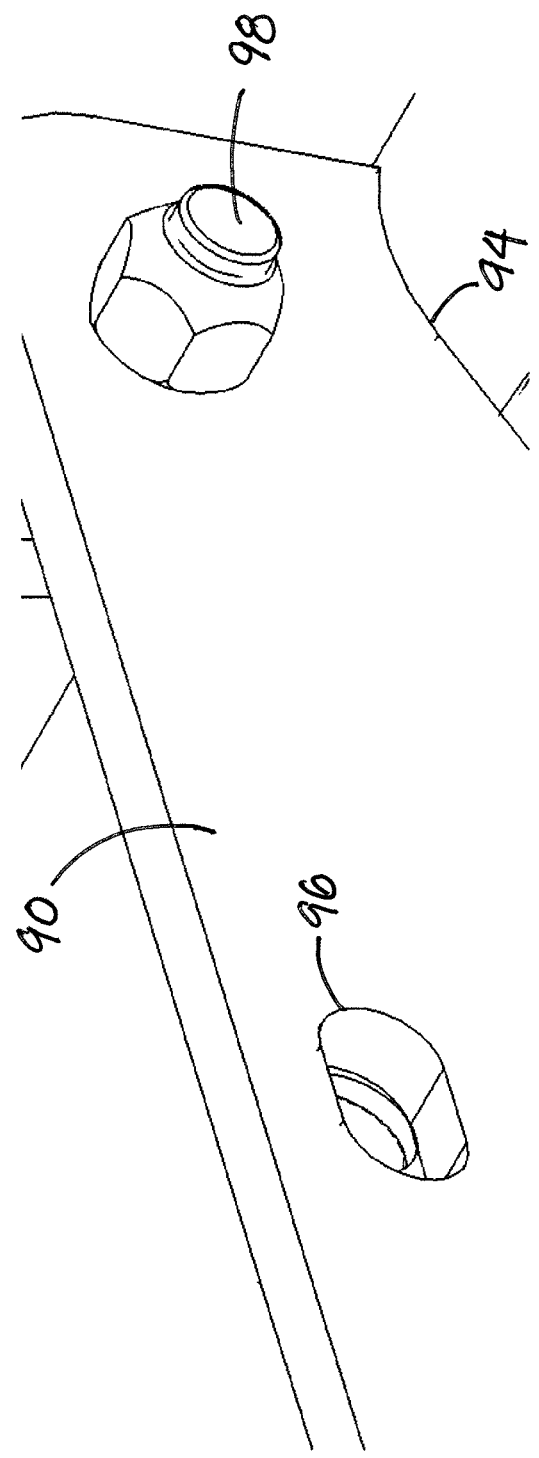
FIG. 10 is a schematic perspective view of a portion of the second portion of the guard mounting structure of the guard apparatus, with element removed for clarity, according to an illustrative embodiment.
Figure 11:
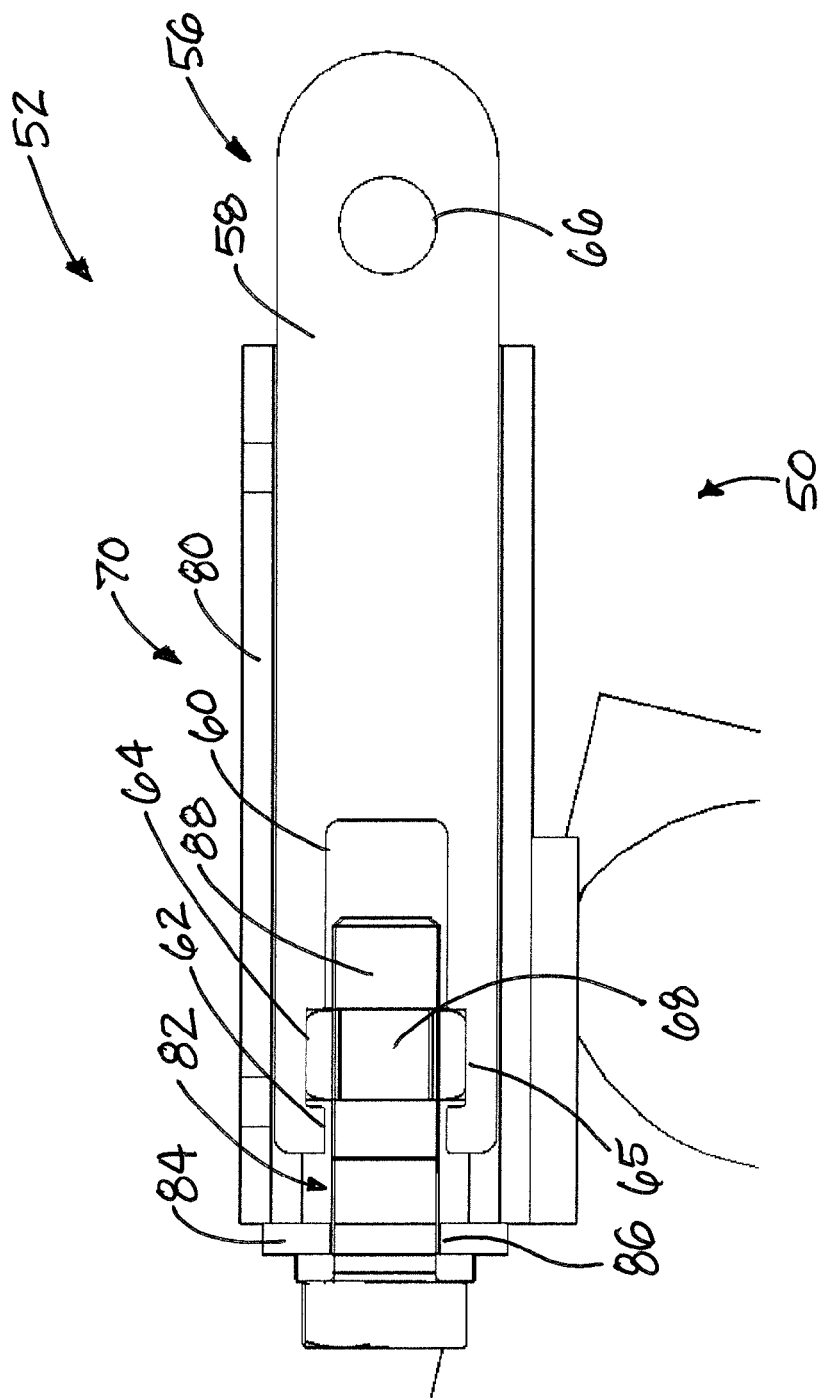
FIG. 11 is a schematic side sectional view of a portion of the base assembly of the guard mounting structure, according to an illustrative embodiment.
Figure 12:
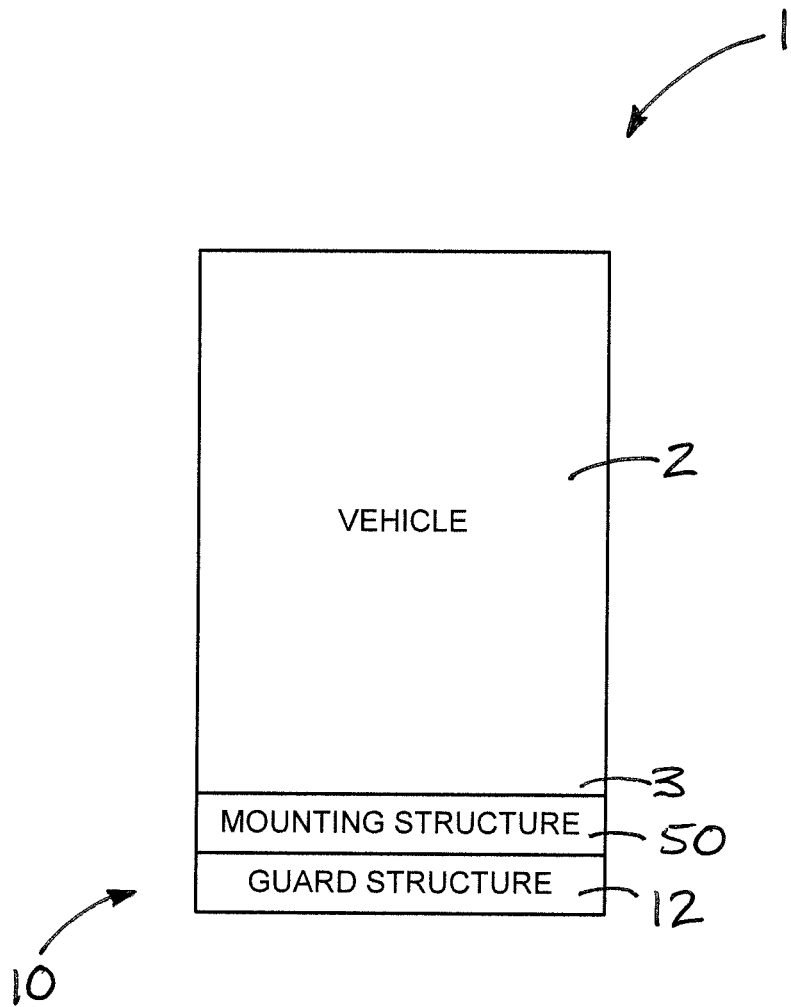
FIG. 12 is a schematic diagram of an illustrative embodiment the system of the present disclosure.

With reference now to the drawings, and in particular to FIGS. 1 through 12 thereof, a new vehicle guard system embodying the principles and concepts of the disclosed subject matter will be described.

Applicant has recognized that while securing a vehicle guard in an operational position using a latch with a physical interlock is operable, adverse environmental conditions experienced by the guard, as well as the structure mounting the guard on the vehicle, exposes the physically interlocking elements of the latch to corrosion as well as debris from the road environment (e.g., dirt) that can impair the operation of the latch when the guard needs to be tilted. Moreover, while a relatively close fit of the interlocking parts is desirable to avoid vibration and rattling of the guard during road travel, the close fit between parts tends to catch and trap the dirt and road debris that can make the latch difficult to operate and release when the guard needs to be tilted. Corrosion of the parts can also make the latch difficult to operate after years spent on the road.

Applicants have also recognized that a latching or securing system that does not rely upon a physical interlock of elements would not be as vulnerable to corrosion and road debris making the guard difficult to release for tiling. Advantageously, a latch or securing system that employs magnetic force rather than a physical interlock of parts is less vulnerable to be compromised by corrosion and the accumulation of road dirt and debris.

In one aspect, the disclosure is directed to a system 1 which includes a vehicle 2 for having a guard apparatus mounted thereon. The vehicle may be characterized by having a front end 3 on which the guard apparatus 10 is mounted. Illustratively, the vehicle may comprise a truck such as a semi tractor as aspects of the disclosure are highly beneficial for use on over-the-road trucks, but also could be applied to virtually any vehicle. The system 1 may also include the guard apparatus 10 in combination with the vehicle 1, although it should be recognized that the disclosure also relates to the guard apparatus 10 independent of the vehicle.

The guard apparatus 10 may include a guard structure 12 which may generally include a plurality of bars joined together, typically into an integrated unit such as by welding of the bars together although other means of attachment may be employed. The guard structure 12 may have opposite ends for positioning adjacent to opposite sides of the front end 3 of the vehicle when mounted on the vehicle. The opposite ends may comprise a first end 14 and a second end 15, and the guard structure may also have a top 16 and a bottom 17 reflecting the relative positions of those portions when the guard structure is positioned for operational use on a vehicle. The guard structure may also have a major plane 8 to which the various elements and positions of the guard structure 12 may be related.

The plurality of bars forming the guard structure 12 may include a lower bar 20 which may be located toward the bottom 17 of the guard structure. In some embodiments, the lower bar extends substantially the entire distance between the first end 14 and the second end 15. The lower bar 20 may be configured to extend substantially horizontally when the guard structure is mounted on a vehicle. The lower bar of the illustrative embodiments includes a central section 22 and a pair of lateral sections 24, 25 which are positioned on opposite lateral sides of the central section. The central section 22 may be located in the major plane 8 of the guard structure, and the lateral sections 24, 25 may be tilted or angled out of the major plane in a manner such that the sections 24, 25 extend slightly rearwardly from the central section when the guard structure is mounted on a vehicle. The lower bar 20 may also include lateral ends 26, 27 which may be positioned at or close to the ends 14, 15 of the guard structure.

The plurality of bars of the guard structure may also include an upper bar 30 which may be located toward the top 16 of the guard structure. In some embodiments, the upper bar may include a top section 32 and a pair of side sections 34, 35 which extend from the top section 32. The top section 32 may be configured to extend substantially horizontally when the guard structure is mounted on a vehicle, and the side sections may be configured to depend or extend downwardly from the top section to the lower bar 20, and in some embodiments may be extend substantially vertically. The side sections 34, 35 may be laterally spaced from each other. The top section 32 may protrude partially forward from the major plane, while the side sections may protrude forwardly from the major plane to a greater degree. The upper bar 30 may have opposite ends 36, 37 which may be connected, and in some embodiments directly attached, to the lower bar. Illustratively, the opposite ends 36, 37 of the upper bar may be attached to the central section 22 of the lower bar.

The plurality of bars of the guard structure 12 may further include an intermediate bar 40 which may generally be located between the upper and lower bars of the structure 12, and may extend between the opposite ends 14, 15 of the guard structure. In some embodiments, the intermediate bar 40 may extend from the first end 14 to the second end 15, and may form the ends 14, 15 of the guard structure. The intermediate bar may have a middle section 42 and end sections 43, 44 which are located on opposite sides of the middle section. The middle section may be located in the major plane 8 of the guard structure. The end sections 43, 44 may be tilted or angled with respect to the middle section and with respect to the major plane such that the end sections are turned rearwardly when the guard structure is mounted on a vehicle. Portions of the end sections 43, 44 may also be downwardly-turned with respect to the middle section 42, and the end sections may be attached or directly connected to the lateral ends 26, 27 of the lower bar 20. The side sections 34, 35 of the upper bar may be positioned forward of the intermediate bar 40 such that the side portions pass in front of the intermediate bar and are substantially continuous between the top section 32 and the attachment of the opposite ends 36, 37 to the lower bar, to enhance the integrity of the upper bar and increase impact resistance, as well as providing a simpler fabrication as compared to bars that are welded together so as to appear as though the bars intersect.

The guard apparatus 10 may also include a guard mounting structure 50 for mounting the guard structure 12 to a vehicle in a manner permitting movement of the guard structure, and the major plane of the guard structure, between a first position (see, e.g., FIG. 1) and a second position (see, e.g., FIG. 2) while mounted on the vehicle. The guard mounting structure 50 may permit pivot movement of the guard structure and the major plane about a substantially horizontal axis, and may pivot about the axis. In some embodiments, the major plane of the guard structure 12 may be movable about an arc of approximately 90 degrees between the first and second positions, although others degrees of movement may be utilized. The first position may be considered to be an operational position which is characterized by the major plane 8 of the guard structure 12 being oriented in a substantially vertical orientation, while the second position may be considered to be a maintenance position which is characterized by the major plane of the guard structure being oriented in a substantially horizontal orientation. The guard apparatus 10 may include a pair of guard mounting structures, with the structures 50 being laterally spaced and located toward but not necessarily at the ends 14, 15 of the guard structure. For the purposes of this description, an illustrative guard mounting structure will be described with the understanding that if one or more additional guard mounting structures are utilized, it may have a similar or identical structure.

The guard mounting structure 50 may include a first portion 52 for mounting on the vehicle and a second portion 54 for mounting on the guard structure 12, and the portions 52, 54 may be mounted together in a manner that permits movement of the guard structure with respect to the vehicle. In greater detail, the first portion 52 may include a mount assembly 56 with a slider element 58 which may be elongated in a forward and rearward direction of the vehicle when the guard apparatus 10 is mounted on a vehicle. The slider element 58 may include a mounting cavity 60 which may form a gap 62 in one of the ends of the elongated slider element. The mounting cavity 60 may also be elongated in shape and extend along a portion of the length of the slider element. The mounting cavity may have opposing cavity surfaces 64, 65 defining at least a portion of the cavity 60. The slider element may also include a mounting hole 66 which may be positioned on the slider element at an end which is generally opposite of the mounting cavity and gap 62. The hole 66 may receive a pin or a fastener that also extends through one or more holes formed in a receiver tube on the vehicle to effectuate mounting of the element 58 on the vehicle. The mount assembly 56 may also include a nut element 68 which may be positioned in the mounting cavity and may be positioned between the cavity surfaces 64, 65 with a fit with the surfaces that generally prevents the nut element from rotating in the mounting cavity and with respect to the slider element.

The first portion 52 may also include a base assembly 70 which may be movably mounted on the mount assembly 56. A portion of the base assembly 70 may be adjustable with respect to the mount assembly 56 in order to provide a degree of forward and rearward movement of the base assembly 70 with respect to the mount assembly 56, thus providing a degree of forward and rearward adjustment with respect to the vehicle when the guard apparatus is mounted on a vehicle. The base assembly 70 may include a base element 72 may have a first section 76 and a second section 78. In some illustrative embodiments, the first section 76 may be oriented in a substantially vertically oriented plane, while the second section 78 may be oriented in a substantially horizontally oriented plane, when the guard apparatus is mounted on a vehicle. The base element may have a first pivot aperture which may be located on the first section 76. The base assembly 70 may also include a barrel element 80 for receiving at least a portion of the slider element 58. The barrel element 80 may be mounted on the base element 72, such as on the second section 78 thereof. The barrel element 80 may define an interior 82 into which the slider element is at least partially inserted, and the barrel element may have opposite ends. In some embodiments, the barrel element comprises a tube with a substantially rectangular cross-section for receiving the slider element with a similar although not identical substantially rectangular cross-sectional shape.

The base assembly 70 may also include a cap element 84 which is mounted on the barrel element 80, such as located toward one end of the barrel element and may function to substantially close one end of the barrel element. The cap element 84 may include a hole 86 formed therein. The base element 70 may also include a bolt element 88 which extends through the cap element 84 and may be threaded into the nut element 68 of the mount assembly.

By this structure, rotation of the bolt element in a first direction tends to move the slider element with respect to the barrel element in a first direction, and rotation of the bolt element in a second direction tends to move the slider element with respect to the barrel element in a second direction that is opposite of the first direction, therefore providing forward and rearward or fore and aft adjustment of the position of the base assembly with respect to the mount assembly. Movement of the slider element with respect to the barrel element, when a pin or fastener passing through the hole 66 fixes the position of the slider element on the receiver of the vehicle, can function to press or hold the barrel element against the receiver tube of the vehicle to effectively secure the barrel element as well as the other elements of the base assembly 70 to the vehicle. Thus, rotation of the bolt element in one direction may function to tighten the securement of the first portion to the vehicle, and rotation of the bolt element in the opposite direction may function to loosen the first portion from the vehicle.

The second portion 54 of the guard mounting structure 50 may be movably mounted on the first portion 52 to permit movement of the second portion with respect to the first portion, as well as movement of the guard structure 12 with respect to the guard mounting structure. The second portion 54 may be mounted on the first portion 52, and may be movably mounted on the first portion such as by being pivotally mounted on the first portion. The second portion 54 may comprise an attachment member 90 which may be secured to the guard structure 12, and may have a second pivot aperture which is generally alignable with the first pivot aperture of the base element. The attachment member 90 may be attached to the lower bar 20 of the guard structure, and in some embodiments may be attached to the intermediate bar 40 of the guard structure, and in some embodiments may also be attached to the upper bar 30 of the guard structure. The attachment member may function to further tie and unite the bars together in addition to any direct attachment of the bars to each other. Advantageously, the line of the weld of the attachment member to the bar or bars may not necessarily be straight, and may have a curved configuration (see, e.g., FIG. 7) that provides greater resistance to damage and breakage of the weld, particularly resulting from impact forces that are oriented approximately 45 degrees to the major plane of the guard structure.

The attachment member 90 may extend substantially parallel to one of the side sections 34, 35 of the upper bar and may be attached to the side section along a portion of the length of the side section of the upper bar. The attachment member 90 may comprise an attachment plate which may have an attachment edge 94 which is attached to, for example, the lower bar 20 and the intermediate bar 40, and may also be attached to a portion of the side section of the upper bar. The attachment plate 94 may have a first adjustment aperture 96, and the aperture 96 may be elongated in a direction that is substantially vertically oriented when the guard structure is oriented in the first position to provide a degree of adjustment for the guard structure in a vertical direction with respect to the guard mounting structure and the vehicle on which the mounting structure is attached. The guard mounting structure 50 may also include a pivot pin 98 which joins the first portion and the second portion in a pivotable relationship with respect to each other. The pivot pin 98 may extend through the first pivot aperture and the second pivot aperture to connect the first and second portions to permit pivot movement of the second portion with respect to the first portion. Illustratively, the pivot pin 98 may be comprised of a threaded fastener and a nut mounted on the threaded fastener.

The guard apparatus may also include a guard securing structure 100 which is configured to secure the guard structure 12 in the first position and release the guard structure to move toward the second position. The guard securing structure 100 may be releasable upon application of a threshold degree of force to the guard structure 12 in the first position, and such a force may be applied to the guard structure in a direction toward the second position. In some of the most preferred embodiments, the guard securing structure 100 is configured to secure the guard structure 12 in the first position using a magnetic attraction force that may be overcome by the application of a force to the guard structure that overcomes the magnetic attraction force. In such embodiments, the guard securing structure 100 may be configured to release the guard structure from the first position without the requirement of actuation of a mechanical release which provides a physical or interlocking barrier to movement of the guard structure out of the first position and toward the second position.

The guard securing structure 100 may comprise a magnetic element 102 which may be mounted on one of the first or second portions of the guard mounting structure, and may also comprise a magnetically-receptive element 104 which may be mounted on the other of the first or second portions of the guard securing structure such that element 102 is mounted on one of the portions and element 104 is mounted on the other of the portions. The magnetic element 102 and the magnetically-receptive element 104 may be mounted on the first and second portions of the guard mounting structure 50 in a manner such that the magnetic 102 and magnetically-receptive 104 elements are positioned adjacent to each other in the first position of the guard structure, and may be mounted on the first and second portions in a manner such that the magnetic and magnetically-receptive elements contact or abut against each other in the first position of the guard structure (and may be separated in the second position).

In illustrative embodiments, the magnetic element 102 is mounted on the second portion 54 and the magnetically-receptive element 104 is mounted on the first portion 52 of the guard mounting structure. The magnetically-receptive element may comprise a portion of a securing plate 106, and the securing plate may be mounted on the base element 72 of the first portion 52 of the guard mounting structure. The magnetic element may comprise a magnet, and the magnet may be supported by a support tab 108. In some embodiments, a compressible or elastomeric material may be positioned between the magnet and the support tab to facilitate the alignment and abutment of the surface of the magnet with the surface of the securing plate. The support tab 108 may be mounted on the attachment member 90 of the second portion and may be mounted in a manner such that the position of the support tab is adjustable. The position of the support tab may be adjustable in a substantially vertical direction when the guard structure 12 is in the first position. The support tab 108 may have a second adjustment aperture 110, and an adjustment fastener 112 may be extended through the second adjustment aperture and the first adjustment aperture of the attachment member to attach the support tab 108 and the magnet to the attachment member 90 of the second portion of the guard mounting structure in an adjustable manner. One of the adjustment apertures may be elongated to permit a degree of shifting of the adjustment fastener 112 and movement of the support tab with respect to the attachment member. Adjustment of the position of the attachment member may be in any suitable directions, and in the illustrative embodiments is primarily in a substantially vertical direction when the guard structure is in the first position.

In the illustrative embodiments, the abutting surfaces of the magnetic element 102 and the magnetically-receptive element 104 are substantially vertically oriented when the guard structure is in the operational position to minimize the forces applied to the elements 102, 104, and the axis about which the guard structure is pivotable may be located forwardly of the elements 102, 104 on the guard apparatus 10 so forces that might tend to separate the elements unintentionally may be minimized. Also in embodiments, the mounting of the magnetic element and the magnetically-receptive element is such that forward movement of the vehicle during road travel tends to cause the abutting surfaces of the elements to be pressed together to minimize any unintentional separation of the elements.

Illustrative embodiments may utilize a magnet that includes rare earth materials, and may have a holding power that requires 200 pounds of force (or greater) to separate the magnet from a magnetically-receptive material. Further illustrative embodiments of the guard apparatus may utilize bars that are tubular and hollow, and that have diameters of approximately 3 inches, and may be formed of stainless steel material, although other configurations may be utilized. The attachment member may be formed of a plate material having a thickness of approximately ⅜ inch. The distance between the lower and intermediate bars may be approximately 8 inches to provide clearance for the beam of fog lights on the vehicle, and the overall height from the top of the guard structure to the bottom may be approximately 28 inches.

It should be appreciated that in the foregoing description and appended claims, that the terms "substantially" and "approximately," when used to modify another term, mean "for the most part" or "being largely but not wholly or completely" that which is specified" by the modified term.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that the steps disclosed in the text and/or the drawing figures may be altered in a variety of ways. For example, the order of the steps may be rearranged, substeps may be performed in parallel, shown steps may be omitted, or other steps may be included, etc.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A guard apparatus for mounting on a vehicle, the apparatus comprising:
a guard structure comprising a plurality of bars joined together, the guard structure having opposite ends for positioning adjacent to opposite sides of the front end of the vehicle, the guard structure having a top and a bottom, the guard structure having a major plane;
a guard mounting structure configured to mount the guard structure to the vehicle in a manner permitting movement of the major plane of the guard structure between a first position and a second position; and a guard securing structure configured to secure the guard structure in the first position and release the guard structure to move toward the second position, the guard securing structure being configured to secure the guard structure in the first position using magnetic attraction force.

2. The apparatus of claim 1 wherein the guard securing structure is releasable from the first position upon application of a threshold degree of force to the guard structure in a direction toward the second position and without actuation of a mechanical release.

3. The apparatus of claim 1 wherein the guard mounting structure includes a first portion configured to mount on the vehicle and a second portion mounted on the guard structure, the first portion and the second portion being movably mounted together;

wherein the guard securing structure includes a magnetic element with a magnetic surface mounted on one of the first and second portions of the guard mounting structure and a magnetically-receptive element with a magnetically receptive surface mounted on an other one of the first and second portions of the guard mounting structure; and wherein the magnetic element and the magnetically-receptive element are positioned on the portions of the guard mounting structure such that pivoting of the guard structure toward the first position moves the magnetic surface of the magnetic element toward and into abutment with the magnetically-receptive surface of the magnetically-receptive element.

4. The apparatus of claim 1 wherein the guard mounting structure is configured to permit the guard structure to pivot about a substantially horizontal axis between the first and second positions.

5. The apparatus of claim 1 wherein the major plane of the guard structure being movable about approximately 90 degrees between the first and second positions.

6. The apparatus of claim 3 wherein the magnetic surface of the magnetic element and the magnetically-receptive surface of the magnetically-receptive element form a stop limiting pivot movement of the guard structure at the first position of the guard structure.

7. The apparatus of claim 1 wherein the guard securing structure comprises a magnetic element and a magnetically-receptive element.

8. The apparatus of claim 7 wherein the guard mounting structure includes a first portion configured to mount on the vehicle and a second portion mounted on the guard structure, the first portion and the second portion being movably mounted together, the magnetic element being mounted on one of the first and second portions of the guard mounting structure and the magnetically-receptive element being mounted on another one of the first and second portions of the guard mounting structure.

9. The apparatus of claim 8 wherein a position of at least one of the magnetic element and the magnetically-receptive element on the first and second portions of the guard mounting structure is adjustable to facilitate abutment of a magnetic surface of the magnetic element and a magnetically-receptive surface of the magnetically-receptive elements in the first position of the guard structure.

10. The apparatus of claim 9 wherein the position of the magnetic element on the guard mounting structure is adjustable about an axis oriented substantially parallel to a pivot axis about which the first and second portions of the guard mounting structure pivot to facilitate abutment of the magnetic and magnetically-receptive elements against each other in the first position of the guard structure.

11. The apparatus of claim 8 wherein the magnetic element is mounted on the second portion of the guard mounting structure in an adjustable position, and the magnetically-receptive element is mounted on the first portion of the guard mounting structure.

12. The apparatus of claim 1 wherein the plurality of bars includes a lower bar located toward the bottom of the guard structure and extending between the opposite ends of the guard structure; and wherein the lower bar has a central section and a pair of lateral sections positioned on opposite lateral sides of the central portion, the central section being located in the major plane of the guard structure and the lateral sections being tilted rearwardly from the central section and from the major plane.

13. The apparatus of claim 1 wherein the plurality of bars includes a lower bar located toward the bottom of the guard structure and extending between the opposite ends of the guard structure;

wherein the plurality of bars includes an upper bar being located toward the top of the guard structure; and wherein the upper bar includes a top section and a pair of side sections, the top section being configured to extend substantially horizontally when the guard structure is mounted on the vehicle, the side sections depending from the top section to the lower bar.

14. The apparatus of claim 13 wherein the upper bar has opposite ends, the opposite ends of the upper bar being connected to the lower bar.

15. The apparatus of claim 1 wherein the plurality of bars includes a lower bar located toward the bottom of the guard structure and extending between the opposite ends of the guard structure;

wherein the plurality of bars includes an upper bar being located toward the top of the guard structure; and wherein the plurality of bars includes an intermediate bar located between the upper and lower bars.

16. The apparatus of claim 15 wherein the upper bar includes a top section and a pair of side sections, the top section being configured to extend substantially horizontally when the guard structure is mounted on the vehicle, the side sections depending from the top section to the lower bar, the side sections of the upper bar being positioned forward of the intermediate bar such that the side portions are continuous between top section and the opposite ends attachment to the lower bar.

17. A guard apparatus for mounting on a vehicle, the apparatus comprising:

a guard structure comprising a plurality of bars joined together, the guard structure having opposite ends for positioning adjacent to opposite sides of the front end of the vehicle, the guard structure having a top and a bottom, the guard structure having a major plane;

a guard mounting structure configured to mount the guard structure to the vehicle in a manner permitting movement of the major plane of the guard structure between a first position and a second position, the guard mounting structure including a first portion configured to mount on the vehicle and a second portion mounted on the guard structure, the second portion being pivotally mounted on the first portion to pivot about a pivot axis; and a guard securing structure configured to secure the guard structure in the first position using magnetic attraction force and release the magnetic attraction force to permit the guard structure to move toward the second position, the guard securing structure including a magnetic element with a magnetic surface mounted on one of the first and second portions and a magnetically-receptive element with a magnetically receptive surface mounted on an other one of the first and second portions; and wherein the magnetic element and the magnetically-receptive element are positioned on the portions of the guard mounting structure such that pivoting of the guard structure toward the first position moves the magnetic surface of the magnetic element toward and into abutment with the magnetically-receptive surface of the magnetically-receptive element.

18. The apparatus of claim 17 wherein a position of at least one of the magnetic element and the magnetically-receptive element on the guard mounting structure is adjustable to facilitate abutment of the magnetic surface against the magnetically-receptive surface.

19. The apparatus of claim 17 wherein a position of the magnetic element on the guard mounting structure is adjustable on one of the first and second mounting portions.

20. The apparatus of claim 19 wherein adjustment of the position of the magnetic element includes rotational adjustment about an axis oriented substantially parallel to the pivot axis of the guard mounting structure.

21. The apparatus of claim 17 wherein the magnetic element is adjustably mounted on the second portion of the guard mounting structure and the magnetically-receptive element is immovably mounted on the first portion of the guard mounting structure.

22. The apparatus of claim 17 wherein the magnetic surface of the magnetic element and the magnetically-receptive surface of the magnetically-receptive element form a stop limiting pivot movement of the guard structure at the first position of the guard structure.

23. A guard apparatus for mounting on a vehicle, the apparatus comprising:
   a guard structure comprising a plurality of bars joined together, the guard structure having opposite ends for positioning adjacent to opposite sides of the front end of the vehicle, the guard structure having a top and a bottom, the guard structure having a major plane;
   a guard mounting structure configured to mount the guard structure to the vehicle in a manner permitting movement of the major plane of the guard structure between a first position and a second position, the guard mounting structure including a first portion configured to mount on the vehicle and a second portion mounted on the guard structure, the second portion being pivotally mounted on the first portion to pivot about a pivot axis; and
   a guard securing structure configured to secure the guard structure in the first position using magnetic attraction force and release the magnetic attraction force to permit the guard structure to move toward the second position, the guard securing structure including a magnetic element with a magnetic surface mounted on one of the first and second portions and a magnetically-receptive element with a magnetically receptive surface mounted on an other one of the first and second portions;
   wherein the magnetic surface of the magnetic element and the magnetically-receptive surface of the magnetically-receptive element form a stop limiting pivot movement of the guard structure at the first position of the guard structure; and
   wherein a position of at least one of the magnetic element and the magnetically-receptive element on the guard mounting structure is adjustable to facilitate abutment of the magnetic surface against the magnetically-receptive surface.

* * * * *